United States Patent
Ropers et al.

(10) Patent No.: US 11,302,289 B2
(45) Date of Patent: Apr. 12, 2022

(54) DISPLAY ELEMENT, SYSTEM, AND METHOD

(71) Applicant: Rockwell Collins, Inc., Cedar Rapids, IA (US)

(72) Inventors: Michael A. Ropers, Cedar Rapids, IA (US); Donald E Mosier, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 17/209,836

(22) Filed: Mar. 23, 2021

(65) Prior Publication Data

US 2021/0335321 A1    Oct. 28, 2021

Related U.S. Application Data

(60) Provisional application No. 63/015,077, filed on Apr. 24, 2020.

(51) Int. Cl.
*G09G 5/10* (2006.01)
*G02B 27/00* (2006.01)
(Continued)

(52) U.S. Cl.
CPC ........... *G09G 5/10* (2013.01); *G02B 27/0093* (2013.01); *G02B 27/0172* (2013.01); *G06F 3/012* (2013.01); *G06F 3/013* (2013.01); *G09G 3/2003* (2013.01); *G09G 3/3225* (2013.01); *G02B 2027/014* (2013.01); *G02B 2027/0138* (2013.01); *G09G 2300/0452* (2013.01)

(58) Field of Classification Search
USPC ....................................................... 345/694
See application file for complete search history.

(56) References Cited

U.S. PATENT DOCUMENTS 8,605,017 B2    12/2013   Elliott et al.
8,780,133 B2    7/2014    Jeong et al.
(Continued)

FOREIGN PATENT DOCUMENTS

EP    3594934 A3    3/2020
JP    2006244892 A    9/2006

OTHER PUBLICATIONS

Extended Search Report for European Application No. 21168326.3 dated Oct. 5, 2021, 9 pages.

*Primary Examiner* — Chineyere D Wills-Burns
(74) *Attorney, Agent, or Firm* — Suiter Swantz pc llo

(57) ABSTRACT

A system may include a display element. The display element may include pixel groups. Each of the pixel groups may include a first set of sub-pixels and a second set of sub-pixels. The first set of sub-pixels may include: a first sub-pixel; a second sub-pixel; and a third sub-pixel. The second set of sub-pixels may include: a fourth sub-pixel; a fifth sub-pixel; and a sixth sub-pixel. Each of the fourth sub-pixel, the fifth sub-pixel, and the sixth sub-pixel may have a maximum brightness that is dimmer than a maximum brightness of each of the first sub-pixel, the second sub-pixel, and the third sub-pixel. Some or all sub-pixels of one of the first set of sub-pixels or the second set of sub-pixels may be driven while all sub-pixels of the other of the first set of sub-pixels or the second set of sub-pixels are undriven.

11 Claims, 11 Drawing Sheets

(51) Int. Cl.
  *G02B 27/01* (2006.01)
  *G06F 3/01* (2006.01)
  *G09G 3/20* (2006.01)
  *G09G 3/32* (2016.01)
  *G09G 3/3225* (2016.01)

(56) References Cited

U.S. PATENT DOCUMENTS

| | | | |
|---|---|---|---|
| 9,542,885 B2 | 1/2017 | Wang et al. | |
| 9,620,533 B2 | 4/2017 | Kim et al. | |
| 9,633,607 B1* | 4/2017 | Aubert | G09G 3/344 |
| 9,704,927 B2 | 7/2017 | Wang | |
| 9,799,303 B2 | 10/2017 | Mizukoshi et al. | |
| 9,830,713 B1* | 11/2017 | Walker | H04N 5/247 |
| 10,026,783 B2 | 7/2018 | Kim | |
| 10,096,277 B2 | 10/2018 | Hsu | |
| 10,510,811 B2 | 12/2019 | Tu | |
| 10,957,247 B1* | 3/2021 | Raynal | G09G 3/3225 |
| 2005/0116615 A1 | 6/2005 | Matsumoto et al. | |
| 2007/0109468 A1 | 5/2007 | Oku | |
| 2007/0279427 A1* | 12/2007 | Marks | H04N 7/147 |
| | | | 348/E7.083 |
| 2009/0051627 A1* | 2/2009 | Ihata | G09G 3/3208 |
| | | | 345/76 |
| 2009/0284507 A1* | 11/2009 | Ito | G09G 3/3648 |
| | | | 345/207 |
| 2013/0182302 A1* | 7/2013 | Shikii | H04N 9/3161 |
| | | | 359/13 |
| 2013/0194170 A1 | 8/2013 | Saitoh et al. | |
| 2015/0109350 A1* | 4/2015 | Gotoh | G09G 3/3607 |
| | | | 345/88 |
| 2016/0240594 A1 | 8/2016 | Zhu | |
| 2017/0277323 A1* | 9/2017 | Kim | G06F 3/0446 |
| 2018/0040284 A1* | 2/2018 | Kang | G09G 3/003 |
| 2018/0137602 A1 | 5/2018 | Spitzer et al. | |
| 2018/0211580 A1 | 7/2018 | Su et al. | |
| 2019/0066598 A1* | 2/2019 | Kim | G09G 3/3258 |
| 2019/0073938 A1 | 3/2019 | Shi | |
| 2019/0080669 A1* | 3/2019 | Li | G09G 5/10 |
| 2019/0181190 A1 | 6/2019 | Sakamoto | |
| 2019/0302479 A1* | 10/2019 | Smyth | G02B 26/004 |
| 2019/0304387 A1 | 10/2019 | Tomizawa | |
| 2020/0082786 A1* | 3/2020 | Kang | G09G 5/10 |

* cited by examiner

900

902 — PROVIDING A DISPLAY ELEMENT COMPRISING A PLURALITY OF PIXEL GROUPS, EACH OF THE PLURALITY OF PIXEL GROUPS COMPRISING A FIRST SET OF SUB-PIXELS AND A SECOND SET OF SUB-PIXELS, THE FIRST SET OF SUB-PIXELS COMPRISING A FIRST SUB-PIXEL CONFIGURED TO OUTPUT LIGHT OF A FIRST COLOR, A SECOND SUB-PIXEL CONFIGURED TO OUTPUT LIGHT OF A SECOND COLOR, AND A THIRD SUB-PIXEL CONFIGURED TO OUTPUT LIGHT OF A THIRD COLOR, THE SECOND SET OF SUB-PIXELS COMPRISING A FOURTH SUB-PIXEL CONFIGURED TO OUTPUT LIGHT OF THE FIRST COLOR, A FIFTH SUB-PIXEL CONFIGURED TO OUTPUT LIGHT OF THE SECOND COLOR, AND A SIXTH SUB-PIXEL CONFIGURED TO OUTPUT LIGHT OF THE THIRD COLOR, WHEREIN EACH OF THE FOURTHSUB-PIXEL, THE FIFTH SUB-PIXEL, AND THE SIXTH SUB-PIXEL HAS A MAXIMUM BRIGHTNESS THAT IS DIMMER THAN A MAXIMUM BRIGHTNESS OF EACH OF THE FIRST SUB-PIXEL, THE SECOND SUB-PIXEL, AND THE THIRD SUB-PIXEL

904 — DRIVING SOME OR ALL SUB-PIXELS OF ONE OF THE FIRST SET OF SUB-PIXELS OR THE SECOND SET OF SUB-PIXELS WHILE ALL SUB-PIXELS OF THE OTHER OF THE FIRST SET OF SUB-PIXELS OR THE SECOND SET OF SUB-PIXELS ARE UNDRIVEN

FIG.9

DISPLAY ELEMENT, SYSTEM, AND METHOD

CROSS-REFERENCE TO RELATED APPLICATIONS

The present application is related to and claims priority from: U.S. application Ser. No. 63/015,077, titled DISPLAY ELEMENT, SYSTEM, AND METHOD, filed Apr. 24, 2020. U.S. application Ser. No. 63/015,077 is herein incorporated by reference in its entirety The present application is related to U.S. patent application Ser. No. 16/704,322, filed Dec. 5, 2019, which is incorporated by reference in its entirety.

BACKGROUND

Currently, it is difficult to drive emissive displays to extremely low luminance levels required for head-up displays (HUDs), head worn displays (HWDs), and helmet mounted displays (HMDs) operating under very low light level ambient conditions, while still maintaining the capability to drive such displays to a brightness required for operation in bright ambient conditions.

In some HUDs, HWDs, and HMDs, the ambient environments such displays operate in range from near total darkness to full midday sun. The display should be visible to the user under the full range of ambient lighting conditions without impeding perception of the real world.

SUMMARY

In one aspect, embodiments of the inventive concepts disclosed herein are directed to a system. The system may include a display element. The display element may include pixel groups. Each of the pixel groups may include a first set of sub-pixels and a second set of sub-pixels. The first set of sub-pixels may include: a first sub-pixel configured to output light of a first color; a second sub-pixel configured to output light of a second color; and a third sub-pixel configured to output light of a third color. The second set of sub-pixels may include: a fourth sub-pixel configured to output light of the first color; a fifth sub-pixel configured to output light of the second color; and a sixth sub-pixel configured to output light of the third color. Each of the fourth sub-pixel, the fifth sub-pixel, and the sixth sub-pixel may have a maximum brightness that is dimmer than a maximum brightness of each of the first sub-pixel, the second sub-pixel, and the third sub-pixel. Some or all sub-pixels of one of the first set of sub-pixels or the second set of sub-pixels may be driven while all sub-pixels of the other of the first set of sub-pixels or the second set of sub-pixels are undriven.

In a further aspect, embodiments of the inventive concepts disclosed herein are directed to a method. The method may include: providing a display element comprising a plurality of pixel groups, each of the plurality of pixel groups comprising a first set of sub-pixels and a second set of sub-pixels, the first set of sub-pixels comprising a first sub-pixel configured to output light of a first color, a second sub-pixel configured to output light of a second color, and a third sub-pixel configured to output light of a third color, the second set of sub-pixels comprising a fourth sub-pixel configured to output light of the first color, a fifth sub-pixel configured to output light of the second color, and a sixth sub-pixel configured to output light of the third color, wherein each of the fourth sub-pixel, the fifth sub-pixel, and the sixth sub-pixel has a maximum brightness that is dimmer than a maximum brightness of each of the first sub-pixel, the second sub-pixel, and the third sub-pixel; and driving some or all sub-pixels of one of the first set of sub-pixels or the second set of sub-pixels while all sub-pixels of the other of the first set of sub-pixels or the second set of sub-pixels are undriven.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings:

FIG. 9 is a diagram of an exemplary embodiment of a method according to the inventive concepts disclosed herein.

DETAILED DESCRIPTION

Figure 1:
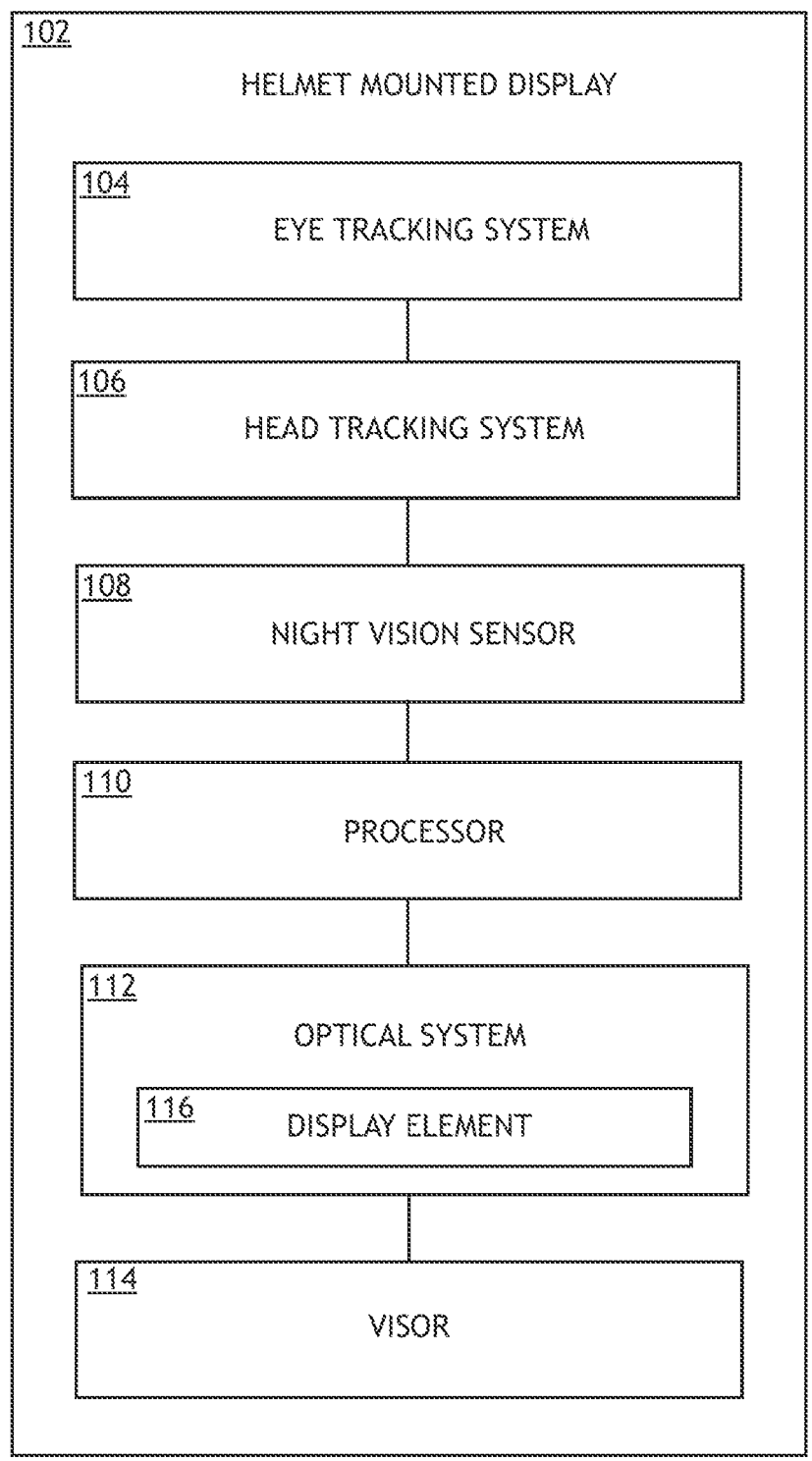
FIG. 1 is a view of an exemplary embodiment of a system including a helmet-mounted display (HMD) according to the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to a method and a system including a first set of sub-pixels and a second set of sub-pixels. Each sub-pixel of the second set of sub-pixels may have a maximum brightness that is dimmer than a maximum brightness of each sub-pixel of the first set of sub-pixels. Some or all sub-pixels of one of the first set of sub-pixels or the second set of sub-pixels may be driven while all sub-pixels of the other of the first set of sub-pixels or the second set of sub-pixels are undriven. In some embodiments, each sub-pixel of the second set of sub-pixels may further have a minimum brightness that is dimmer than a minimum brightness of each sub-pixel of the first set of sub-pixels.

Some embodiments may support full color over a wide range of required dimming conditions. Some embodiments may provide an extended dimming range of a full color display including a six-sub-pixel architecture with separate red, green, and blue subpixels for day mode and separate sub-pixels for night mode. Some embodiments may have improved modulation transfer function (MTF) performance achieved when operating only the night mode subpixels. In some embodiments, bandwidth requirements may be reduced over existing approaches (e.g., which may require 32 or 48 bits per pixel) to 24 bits per pixel maximum, while still maintaining full color over the entire dimming range. In some embodiments, pixel drive complexity may be reduced over existing approaches, which may reduce a total number of transistors needed for each pixel. Some embodiments provide a method to achieve a display with a full color support over an entire display dimming range. Typical HMD applications may require a maximum brightness of 10,000 foot Lamberts (ftL) with a dimming range in excess of 150,000:1. Some embodiments may support full color over the entire dimming range, down to the limits of human perception, and may simplify bandwidth and electronics requirements. Existing approaches have not supported full color down to the limits of human perception.

Some embodiments may be useful for high dynamic luminance range displays and for augmented reality (AR), virtual reality (VR), and/or mixed reality (MR) systems and displays.

Some embodiments may provide an optimized sub-pixel color architecture for improved MTF for night vision imaging performance in day mode and/or night mode for display elements (e.g., AR display elements and/or VR display elements).

Some embodiments may include a sub-pixel architecture optimized to provide a best night time/low luminance display performance for a grayscale (e.g., white grayscale or green grayscale) or color display image. Some embodiments may include a video drive scheme for minimizing bandwidth required for the sub-pixel architecture.

Typically, displays (e.g., AR displays) for head wearable devices (HWDs) (e.g., HMDs and near-eye displays) and head-up displays (HUDs) require very bright displays in order to be seen against sunlit outdoor environments such as a white cloud, blue sky or even the ground. Typically, these displays need to be able to operate in extremely dark environments, which can necessitate the need of a high dynamic brightness range (e.g., 150,000:1) for the displays. In some cases, improved display image performance may be required in a low ambient luminance.

Typically, meeting a brightness requirement for night vision scenes down to 0.01 fL can be a challenge for organic light emitting diode (OLED) and light emitting diode (LED) displays. Typically, each sub-pixel has diode characteristics and requires a forward biased voltage to begin to illuminate the display. Typically, there is too small of a margin between the forward bias and the actual voltage required to illuminate the display at very low light levels. This can result in the use of additional sub-pixel drive schemes such as pulse width modulation (PWM) that can create complexity in the design.

Some embodiments take advantage of dimmer sub-pixels to display capabilities in low light environments. For example, to meet a low light video scene requirement, the dimmer sub-pixels may have less efficiency than other sub-pixels of a pixel group. Reducing the efficiency of the dimmer sub-pixel may increase the margin between the forward bias voltage and the voltage required for the first shade of gray (SOG) (e.g., 0.01 ftL). This may result in a more stable design with less complexity. For example, some embodiments may reduce the efficiency of the dimmer sub-pixels such that when driven just above the minimum drive voltage, the output may fall below threshold brightness requirement (e.g., a 0.01 fL). For example, this may provide a larger voltage gap between the forward bias and minimum drive voltages and may simplify control of pixel brightness.

Some embodiments may provide sub-pixels that have a maximum brightness that is dimmer than a maximum brightness of each of other sub-pixels of the pixel group by including any of various means of reducing the luminous efficacy of the dimmer sub-pixels as compared to the luminous efficacy of the other sub-pixels of a pixel group. Luminous efficacy is the ratio of luminous flux to electrical input power with units of Lumens per Watt. For example, dimming the dimmer sub-pixels may be achieved by: reducing an emitter area of each dimmer sub-pixel to smaller than the dimmer sub-pixel area; applying a mask layer to each dimmer sub-pixel to partially block light; applying a filter (e.g., an organic filter or an inorganic filter) material, which may be polarization sensitive or insensitive, to attenuate light; reducing the effective size of a drive transistor in each dimmer sub-pixel; adding absorbing particles, such as phosphor or quantum dots, to the emitting surface of each dimmer sub-pixel to reduce overall transmission of light; and/or treating the emitting surface of each dimmer sub-pixel, such as to form microstructures, to prevent light from exiting. For example, by reducing the brightness of the dimmer sub-pixels, additional margin may be created between the forward bias voltage and drive voltage. This margin may allow the system to generate sufficient shades of gray (SOG) (e.g., 16 SOG) to the eye under low luminance conditions. In some embodiments, the dimmer sub-pixels may be able to achieve a minimum luminance level of 0.001 fL.

Figure 3:
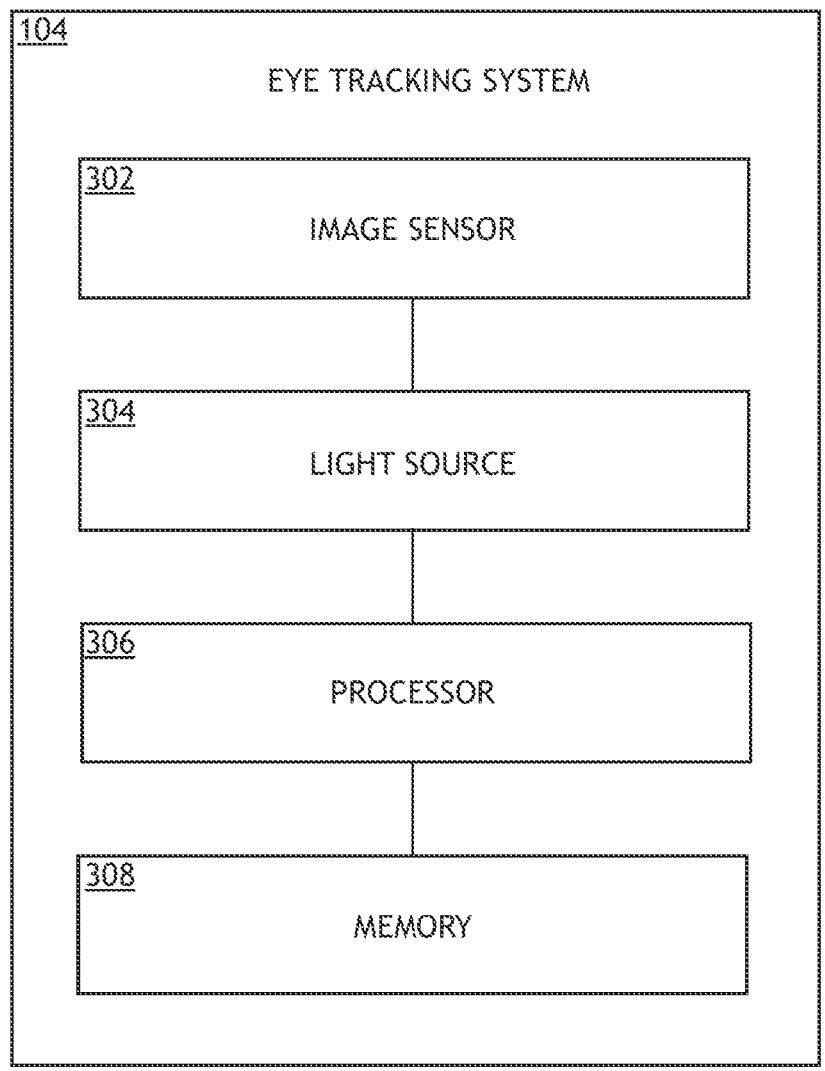
FIG. 3 is a view of the eye tracking system of FIGS. 1-2 according to the inventive concepts disclosed herein.
Figure 4:
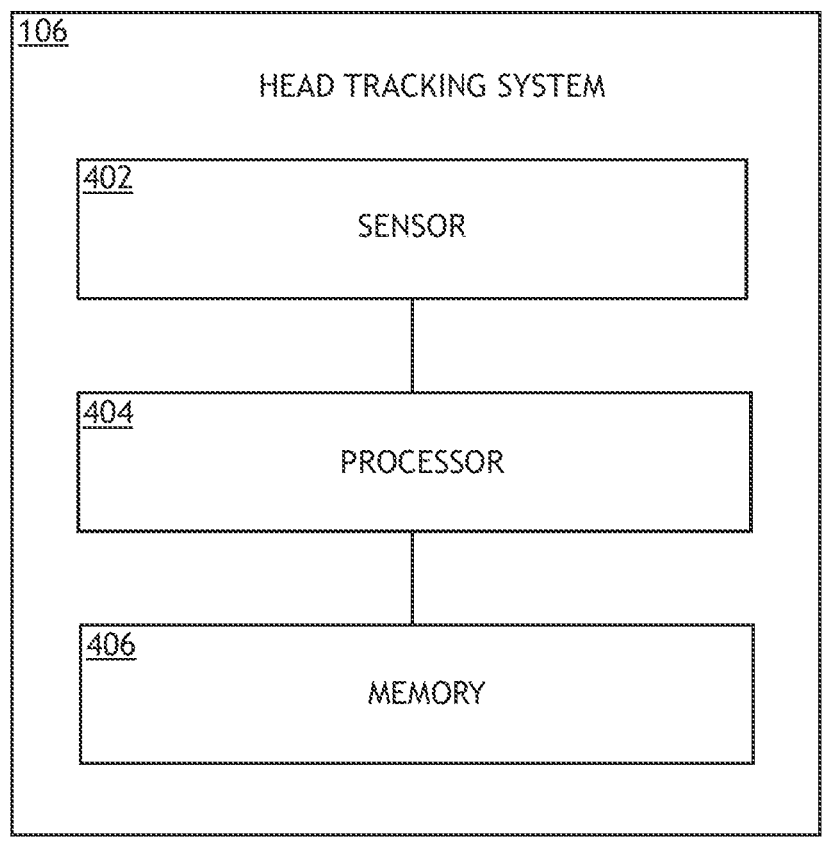
FIG. 4 is a view of the head tracking system of FIGS. 1-2 according to the inventive concepts disclosed herein.
Figure 5:
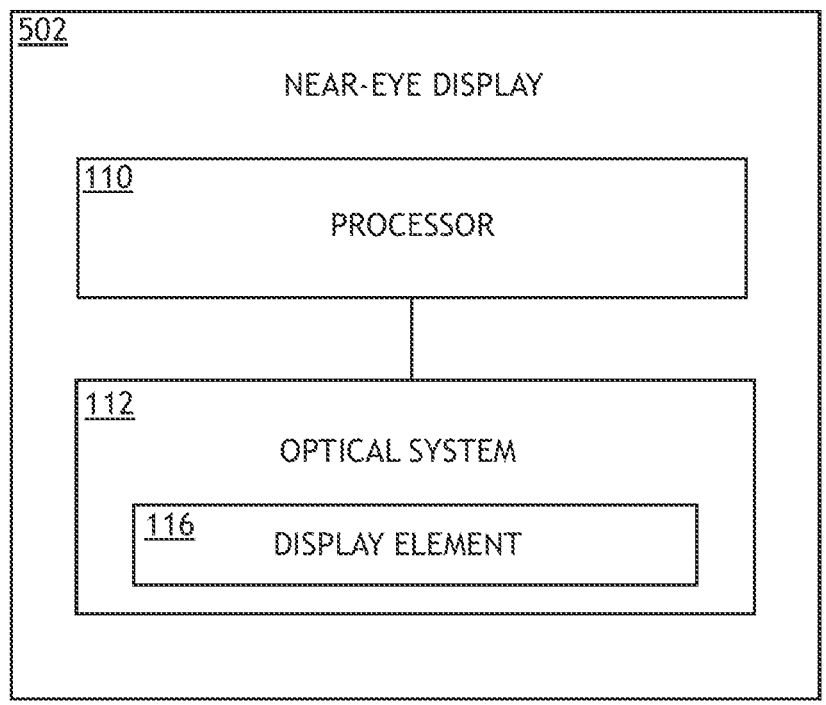
FIG. 5 is a view of an exemplary embodiment of a system including a near-eye display according to the inventive concepts disclosed herein.

Referring now to FIGS. 1-4, an exemplary embodiment of a system 100 according to the inventive concepts disclosed herein is depicted. The system 100 may be implemented as any suitable system, such as a vehicle (e.g., an aircraft (e.g., an airplane and/or helicopter), a watercraft, a submersible craft, an automobile, or a train), a wearable system, and/or a work station. For example, as shown in FIG. 1, the system 100 may include at least one head wearable device (e.g., HMD 102, an AR headset, or a near-eye display (e.g., 502 as shown in FIG. 5)); while some embodiments may include the HMD 102, other embodiments may include one or more elements of the HMD 102 implemented without the HMD 102 or in another device. In some embodiments, the HMD 102 may include at least one eye tracking system 104, at least one head tracking system 106, at least one night vision sensor 108, at least one processor 110, at least one optical system 112, and at least one visor 114, some or all of which may be communicatively coupled at any given time.

Figure 2:
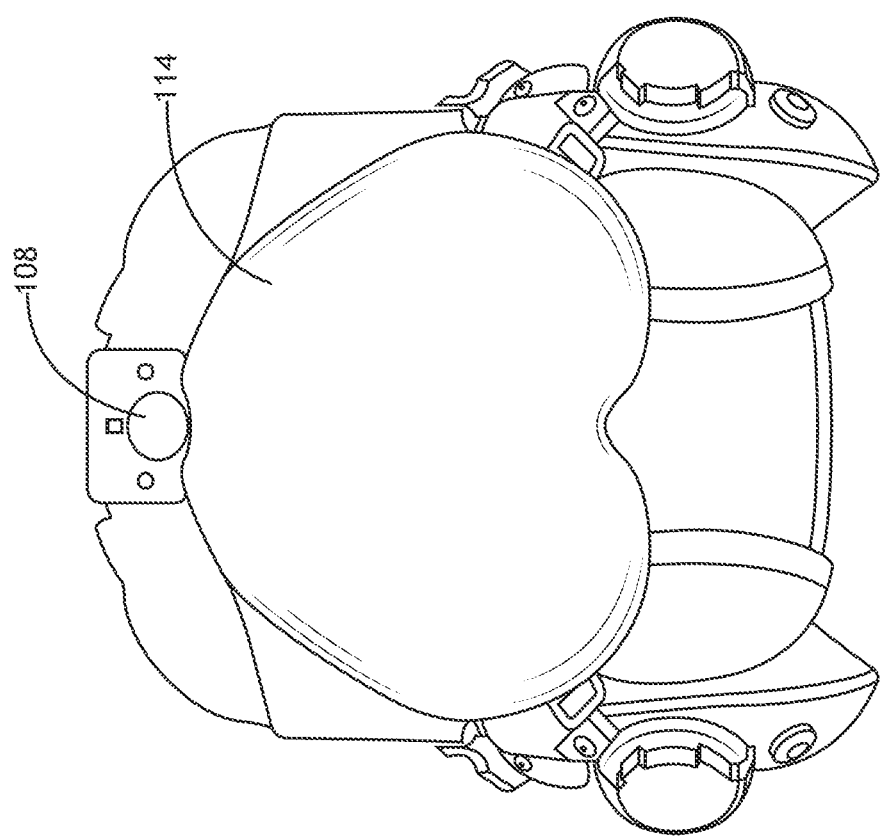
FIG. 2 is a view of the HMD of FIG. 1 according to the inventive concepts disclosed herein.

The HMD 102 may be implemented as any suitable HMD in any suitable environment. For example, as shown in FIG. 2, the HMD 102 may be implemented as a lightweight, wide field of view (FOV), off-the-visor HMD with an integrated night vision system that may provide a user with unparalleled and intuitive access to flight, navigation, tactical, and/or sensor information that may, for example, be displayed on the visor 114.

The eye tracking system 104 may include at least one infrared light source 302 (e.g., at least one infrared light emitting diode (LED)), at least one infrared image sensor 304, at least one processor 306, and at least one memory 308, as well as other components, equipment, and/or devices commonly included in an eye tracking system, some or all of which may be communicatively coupled at any time, as shown in FIG. 3. The eye tracking system 104 may be configured to track eye gestures, track movement of a user's eye, track a user's gaze, and/or otherwise receive inputs from a user's eyes. The eye tracking system 104 may be configured for performing fully automatic eye tracking operations of users in real time.

The infrared light source 302 may be configured to emit infrared light onto an environment onto at least one eye of a user.

The infrared sensitive image sensor 304 may be configured to capture images of the environment illuminated by the infrared light source 302.

The processor 306 may be configured to process data received from the infrared sensitive image sensor 304 and output processed data to one or more devices or systems of the HMD 102 and/or the system 100. For example, the processor 306 may be configured to generate eye tracking data and output the generated eye tracking data to one of the devices (e.g., the processor 110) of the HMD 102 and/or the system 100. The processor 306 may be configured to run various software applications or computer code stored (e.g., maintained) in a non-transitory computer-readable medium (e.g., memory 308) and configured to execute various instructions or operations. The processor 306 may be implemented as a special purpose processor configured to execute instructions for performing (e.g., collectively performing if more than one processor) any or all of the operations disclosed throughout. For example, the processor 306 may be configured to: receive image data from the infrared sensitive image sensor 304; track movement of at least one eye of a user based on the image data; and/or output eye tracking system data indicative of the tracked movement of the at least one eye of the user. For example, the processor 306 may be configured to: perform visor distortion correction operations; perform eye mapping and alignment operations; output, via at least one data connection, eye tracking system data (e.g., indicative of eye azimuth and/or elevation) to an aircraft interface, simulator interface, and/or other computing device of the system; and/or perform a head tracking translation operation.

The head tracking system 106 may have optical, magnetic, and/or inertial tracking capability. The head tracking system 106 may include at least one sensor 402, at least one processor 404, and at least one memory 406, as well as other components, equipment, and/or devices commonly included in a head tracking system, some or all of which may be communicatively coupled at any time, as shown in FIG. 4. The at least one sensor 402 may be at least one optical sensor (e.g., an optical infrared sensor configured to detect infrared light), at least one magnetic sensor, and/or at least one inertial sensor. The head tracking system 106 may be configured to determine and track a position and an orientation of a user's head relative to an environment. The head tracking system 106 may be configured for performing fully automatic head tracking operations in real time. The processor 404 of the head tracking system 106 may be configured to process data received from the sensors 402 and output processed data to one of the computing devices of the system and/or the processor 110 for use in generating images aligned with the user's field of view, such as augmented reality or virtual reality images aligned with the user's field of view to be displayed by the optical system 112 onto the visor 114. For example, the processor 404 may be configured to determine and track a position and orientation of a user's head relative to an environment. Additionally, for example, the processor 404 may be configured to generate position and orientation data associated with such determined information and output the generated position and orientation data. The processor 404 may be configured to run various software applications or computer code stored in a non-transitory computer-readable medium (e.g., memory 406) and configured to execute various instructions or operations. The at least one processor 404 may be implemented as a special purpose processor configured to execute instructions for performing (e.g., collectively performing if more than one processor) any or all of the operations disclosed throughout.

The night vision image sensor 108 (e.g., a night vision camera) may be configured to capture night vision images of the environment. In some embodiments, the night vision image sensor 108 may be configured to detect infrared light. In some embodiments, the night vision image sensor 108 may be configured to output night vision image data to the processor 110, which may output the images to the optical system 112 to be displayed onto the visor 114.

The at least one processor 110 may be implemented as any suitable processor(s), such as at least one general purpose, at least one image processor, at least one graphics processing unit (GPU), and/or at least one special purpose processor, configured to execute instructions for performing (e.g., collectively performing if more than one processor) any or all of the operations disclosed throughout. In some embodiments, the processor 110 may be communicatively coupled to the display element 116. For example, the processor 110 may be configured to: receive the eye tracking system data; receive the head tracking system data; receive the night vision image data; generate and/or output synthetic vision system image data to the optical system 112, for example, based on the eye tracking system data and/or the head tracking system data; generate and/or output night vision image data to the optical system 112, for example, based on the eye tracking system data and/or the head tracking system data; generate and/or output augmented reality and/or virtual reality image data to the optical system, for example, based on the eye tracking system data and/or the head tracking system data; and/or generate and/or output other image data, which may include vehicle operation (e.g., flight) information, navigation information, tactical information, and/or sensor information to the optical system 112, for example, based on the eye tracking system data and/or the head tracking system data.

The optical system 112 may be configured to receive image data from the processor 110 and project images onto the visor 114 for display to the user. The optical system 112 may include at least one display element 116. While the display element 116 is exemplarily depicted and described as being part of the optical system 112, in some embodiments, the display element 116 may be used in other display applications that do not include an optical system. In some embodiments, the optical system 112 may take the display element 116 as an input and transfer, translates, and/or form an image to the correct size and/or orientation for the user to view the information. In some embodiments, the optical system 112 may include at least one lens, at least one mirror, diffraction gratings, at least one polarization sensitive component, at least one beam splitter, at least one combiner, at least one waveguide, at least one light pipe, at least one window, and/or the display element 116. For example, the optical system 112 may include a collimator. For example, the optical system 112 may include a relay lens. For example, the optical system 112 may include a collimator and a combiner (e.g. a flat combiner). For example, the optical system 112 may include a relay lens and a combiner (e.g., a curved combiner). For example, the optical system 112 may include a prism collimator and a beam splitter. For example, the optical system 112 may include collimator and a waveguide (e.g., a diffractive, mirror, or beam splitter based waveguide).

In some embodiments, the display element 116 may be an emissive display element, such as an OLED or micro-LED display element. In some embodiments, the display element 116 may include red, green, and blue sub-pixels. The display element 116 may be configured to display RGB and/or grayscale images and/or video.

The display element 116 may include a plurality of pixel groups 814 (e.g., as shown in FIGS. 8A-8D). As used throughout, a pixel group is a group of sub-pixels. For example, each of the plurality of pixel groups 814 may include a plurality (e.g., at least six) of sub-pixels 802, 804, 806, 808, 810, 812. For example, each of the plurality of pixel groups 814 may include a first set of sub-pixels and a second set of sub-pixels. For example, the first set of sub-pixels may include: a first sub-pixel 802 configured to output light of a first color (e.g., red); a second sub-pixel 804 configured to output light of a second color (e.g., green); and a third sub-pixel 806 configured to output light of a third color (e.g., blue). For example, the second set of sub-pixels may include: a fourth sub-pixel 808 configured to output light of the first color (e.g., red); a fifth sub-pixel 810 configured to output light of the second color (e.g., green); and a sixth sub-pixel 812 configured to output light of the third color (e.g., blue). In some embodiments, each of the fourth sub-pixel 808, the fifth sub-pixel 810, and the sixth sub-pixel 812 may have a maximum brightness that is dimmer (e.g., at least four times dimmer) than a maximum brightness of each of the first sub-pixel 802, the second sub-pixel 804, and the third sub-pixel 806. In some embodiments, some or all sub-pixels of one of the first set of sub-pixels or the second set of sub-pixels are driven while all sub-pixels of the other of the first set of sub-pixels or the second set of sub-pixels are undriven. In some embodiments, each of the plurality of pixel groups 814 may be configured to provide color output by using 24 bits of bandwidth (e.g., 8 bits per color channel) by only driving one of the first set of sub-pixels or the second set of sub-pixels at a time. 24 bits of bandwidth is significantly less than 48 bits that would be needed for a typical six sub-pixel configuration or 32 bits that would be needed for a typical four sub-pixel configuration; such bandwidth reduction may simplify the interconnect required to provide the pixel groups 814 with color image data. In some embodiments, each of the plurality of pixel groups 814 may include one or more additional sub-pixels having any suitable color and/or brightness.

Additionally, for example, the processor 110 may be configured to: control dimming of and/or grayscale for the sub-pixels 802, 804, 806, 808, 810, 812. Additionally, the processor 110 may be configured to control whether the display element 116 is to be operated in the day mode or the night mode.

Additionally, for example, the processor 110 may be further configured to: operate in a day mode and a night mode; when in the day mode, receive red green blue (RGB) video, and drive some or all of the red, green, and blue sub-pixels 802, 804, 806 of each of the first set of sub-pixels corresponding to the RGB video such that the RGB video is displayed with relatively high brightness; and when in the night mode, receive the RGB video, and drive some or all of the red, green, and blue sub-pixels 808, 810, 812 of each of the second set of sub-pixels corresponding to the RGB video such that the RGB video is displayed with relatively low brightness.

Figure 7:
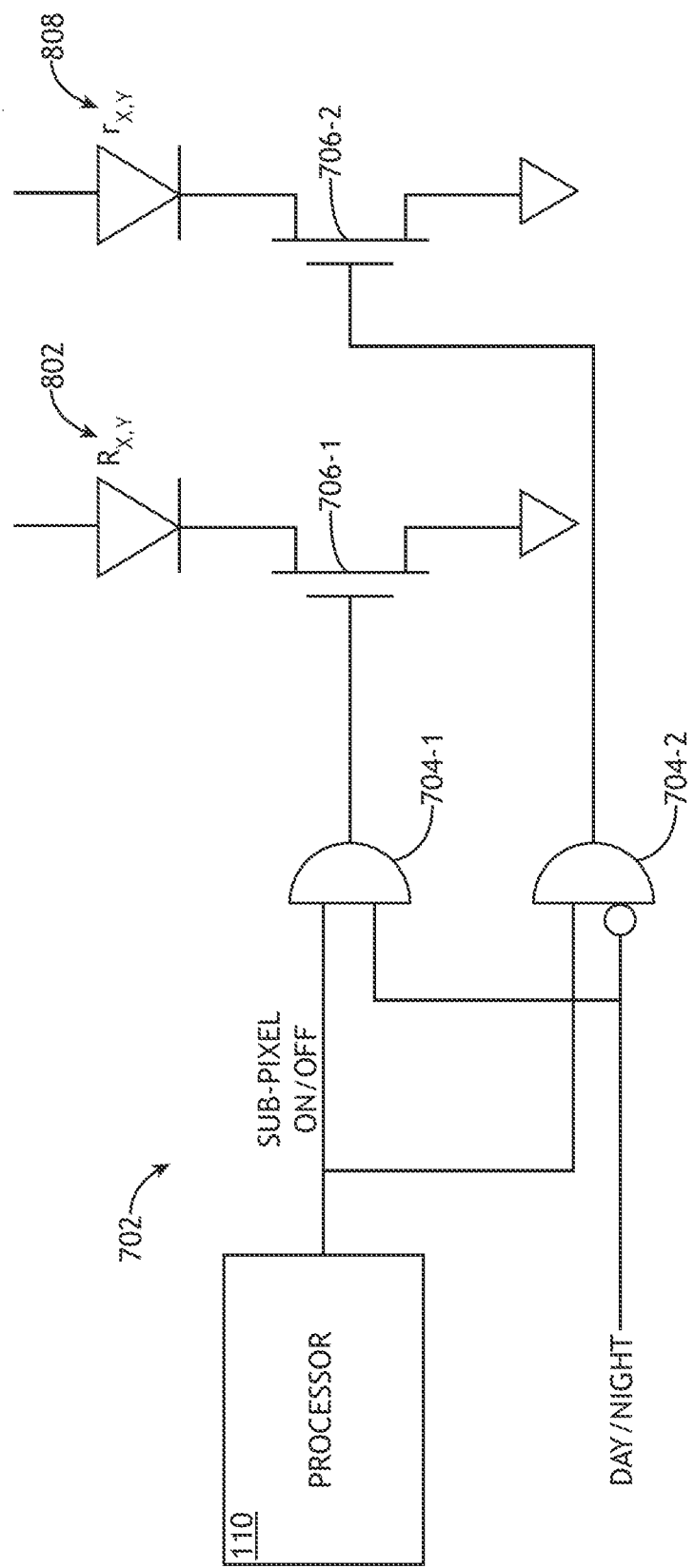
FIG. 7 depict an exemplary embodiment of the processor, control circuitry, and the display element of FIGS. 1, 5, and 6 according to the inventive concepts disclosed herein.

Referring now to FIG. 7, an exemplary embodiment of the system 100 of FIG. 1 including control circuitry 702 according to the inventive concepts disclosed herein is depicted. For example, the control circuitry 702 may be communicatively coupled to the processor 110 and to the display element 116 (e.g., to each sub-pixel 802, 804, 806, 808, 810, 812 of each pixel group 814). For example, for each pair 802/808, 804/810, 806/812 of sub-pixels having a given color, the control circuitry 702 may include gates 704-1, 704-2 and transistors 706-1, 706-2. For example, the control circuitry may include: a first transistor 706-1 communicatively coupled to the first sub-pixel 802, a second transistor (e.g., similarly configured as 706-1) communicatively coupled to the second sub-pixel 804, a third transistor (e.g., similarly configured as 706-1) communicatively coupled to the third sub-pixel 806, a fourth transistor 706-2 communicatively coupled to the fourth sub-pixel 808, a fifth transistor (e.g., similarly configured as 706-2) communicatively coupled to the fifth sub-pixel 810, and a sixth transistor (e.g., similarly configured as 706-2) communicatively coupled to the sixth sub-pixel 812. For example, when operating in the day mode (e.g., for operating in a high luminance environment), the first transistor 706-1, the second transistor (e.g., similarly configured as 706-1), and the third transistor (e.g., similarly configured as 706-1) allow the first, second, and third sub-pixels 802, 804, 806, respectively, to be driven while the fourth transistor 706-2, the fifth transistor (e.g., similarly configured as 706-2), and the sixth transistor (e.g., similarly configured as 706-2) prohibit the fourth, fifth, and sixth sub-pixels 808, 810, 812, respectively, from being driven. For example, when operating in the night mode (e.g., for operating with color night vision video in a low luminance environment), the first transistor 706-1, the second transistor (e.g., similarly configured as 706-1), and the third transistor (e.g., similarly configured as 706-1) prohibit the first, second, and third sub-pixels 802, 804, 806, respectively, from being driven while the fourth transistor 706-2, the fifth transistor (e.g., similarly configured as 706-2), and the sixth transistor (e.g., similarly configured as 706-2) allow the fourth, fifth, and sixth sub-pixels 808, 810, 812, respectively, to be driven. For example, the processor 110 may be configured to determine whether to operate in the day mode or the night mode.

Referring now to FIG. 5, an exemplary embodiment of a system according to the inventive concepts disclosed herein is depicted. The system may be implemented as any suitable system, such as a vehicle (e.g., an aircraft (e.g., an airplane and/or helicopter), a watercraft, a submersible craft, an automobile, or a train), a wearable system, and/or a work station. For example, as shown in FIG. 5, the system may include at least one near-eye display 502. In some embodiments, the near-eye display 502 may include some or all of the elements of the HMD 102 of FIG. 1, and such elements may function similarly as described with respect to the HMD 102 of FIG. 1.

Figure 6:
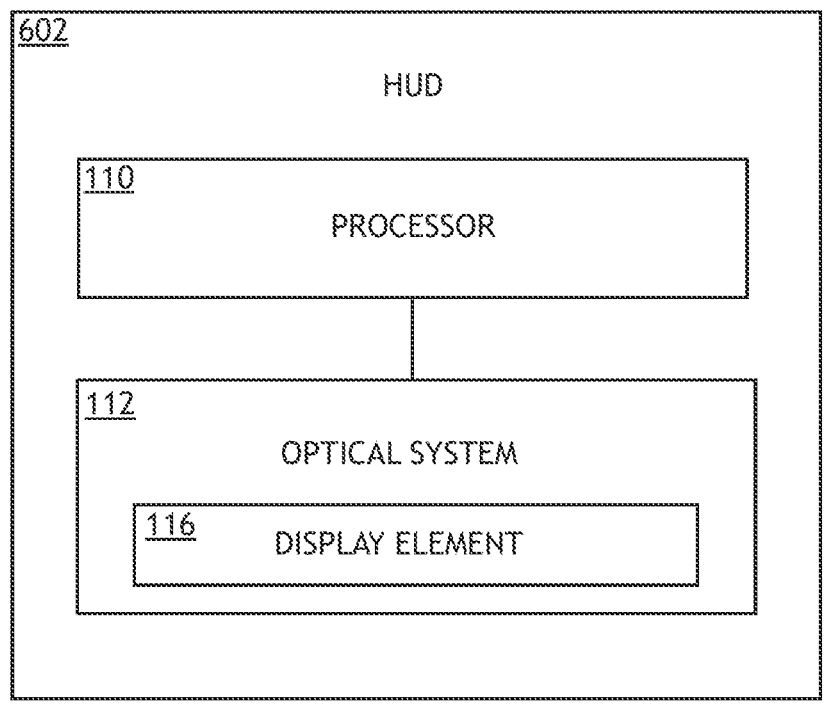
FIG. 6 is a view of an exemplary embodiment of a system including a head-up display (HUD) according to the inventive concepts disclosed herein.

Referring now to FIG. 6, an exemplary embodiment of a system according to the inventive concepts disclosed herein is depicted. The system may be implemented as any suitable system, such as a vehicle (e.g., an aircraft (e.g., an airplane and/or helicopter), a watercraft, a submersible craft, an automobile, or a train), a wearable system, and/or a work station. For example, as shown in FIG. 6, the system may include at least one HUD 602. In some embodiments, the HUD 602 may include some or all of the elements of the HMD 102 of FIG. 1, and such elements may function similarly as described with respect to the HMD 102 of FIG. 1.

Referring now to FIGS. 8A-D, exemplary embodiments of the display element 116 according to the inventive concepts disclosed herein are depicted. For example, the display element 116 may have any suitable sub-pixel architecture.

Figure 8A:
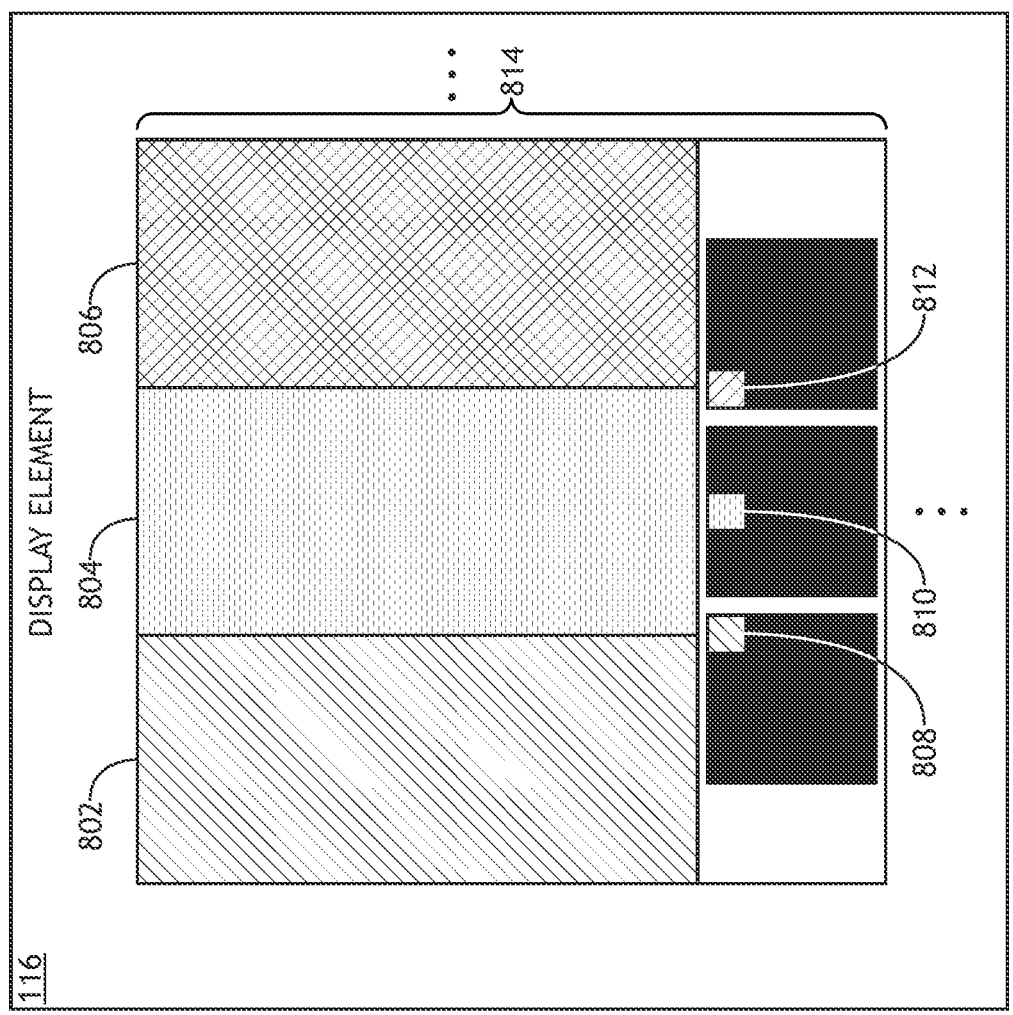
FIGS. 8A, 8B, 8C, and 8D depict exemplary embodiments of the display element of FIGS. 1, 5, and 6 according to the inventive concepts disclosed herein.

As shown in FIG. 8A, the display element 116 may have a six sub-pixel architecture. For example, each pixel group 814 may have dimensions of 10 micrometers (um) by 10 um. For example, each of the first, second, and third sub-pixels 802, 804, 806, may have dimensions of 3.33 um by 7.5 um. For example, each of the fourth, fifth, and sixth sub-pixels 808, 810, 812 may be partially masked to cause the fourth, fifth, and sixth sub-pixels 808, 810, 812 to be dimmer (e.g., four times dimmer or 100 times dimmer) than the first, second, and third sub-pixels 802, 804, 806. For example, each of the fourth, fifth, and sixth sub-pixels 808, 810, 812 may have overall dimensions of 2.5 um by 2.5 um. For example, the unmasked portion of each of the fourth, fifth, and sixth sub-pixels 808, 810, 812 may have dimensions of 0.5 um by 0.5 um. For example, the effective pixel size when operating in night mode may be 0.5 um by 3.5 um, and this arrangement may have an advantageous high MTF. While exemplary dimensions, shapes, and arrangements are shown and described, some embodiments may have any suitable dimensions, shapes, and arrangements. For example, each pixel group 814 may be used for white and/or color symbology and/or white and/or color video when operating in night mode. Additionally, because the first set of sub-pixels and the second set of sub-pixels are not used simultaneously, manufacturing defects can be decreased such that manufacturing yield increases.

Figure 8B:
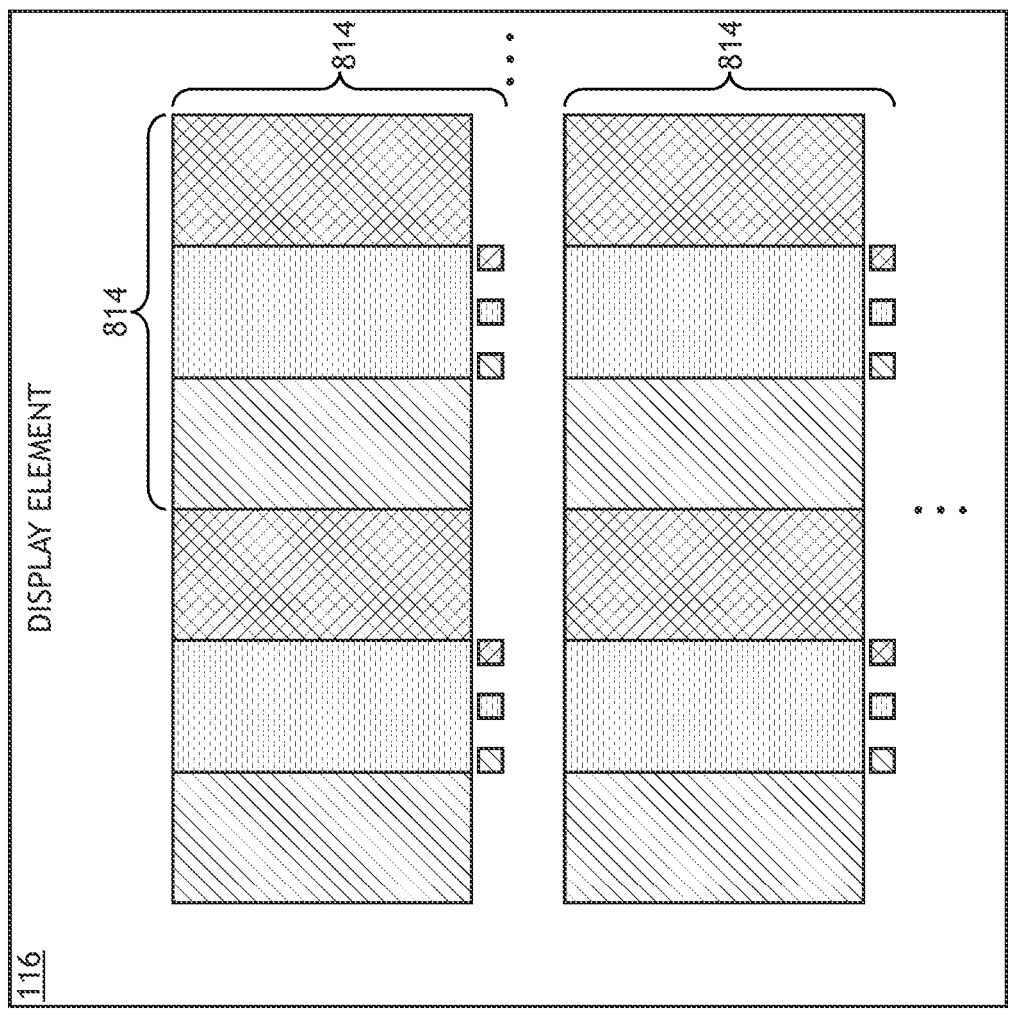

As shown in FIG. 8B, the display element 116 may have a six sub-pixel architecture. For example, the display element 116 may have a plurality of the pixel groups 814 shown in FIG. 8B.

Figure 8C:
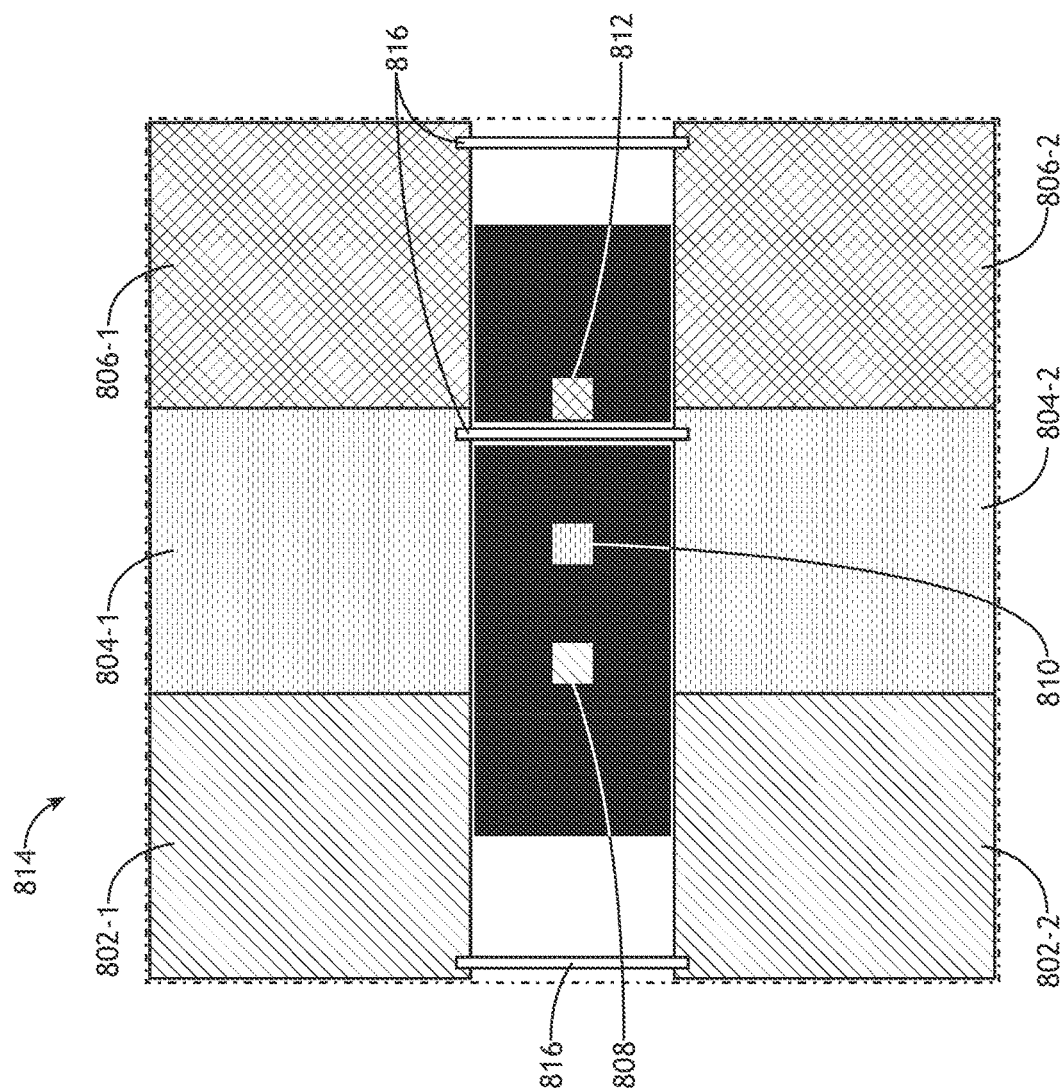

As shown in FIG. 8C, the display element 116 may have a six sub-pixel architecture. The pixel group 814 of FIG. 8C may be implemented and function similarly to the pixel group 814 of FIG. 8A, except that, for the pixel group 814 of FIG. 8C, each of the first, second, and third sub-pixels 802, 804, 806 may be split into two parts (e.g., equal parts) 802-1/802-2, 804-1/804-2, 806-1/806-2. Each pair of the two parts 802-1/802-2, 804-1/804-2, 806-1/806-2 may be electrically connected by a connector 816 such that a single transistor (e.g., 706-1) can control whether the two parts 802-1/802-2, 804-1/804-2, 806-1/806-2 of each pair are allowed to or restricted from illuminating. The fourth, fifth, and sixth sub-pixels 808, 810, 812 may be positioned between the two parts 802-1/802-2, 804-1/804-2, 806-1/806-2. For example, the fourth, fifth, and sixth sub-pixels 808, 810, 812 may be positioned at a center of the pixel group 814, and this may facilitate image alignment and management of distortion correction at a system level.

Figure 8D:
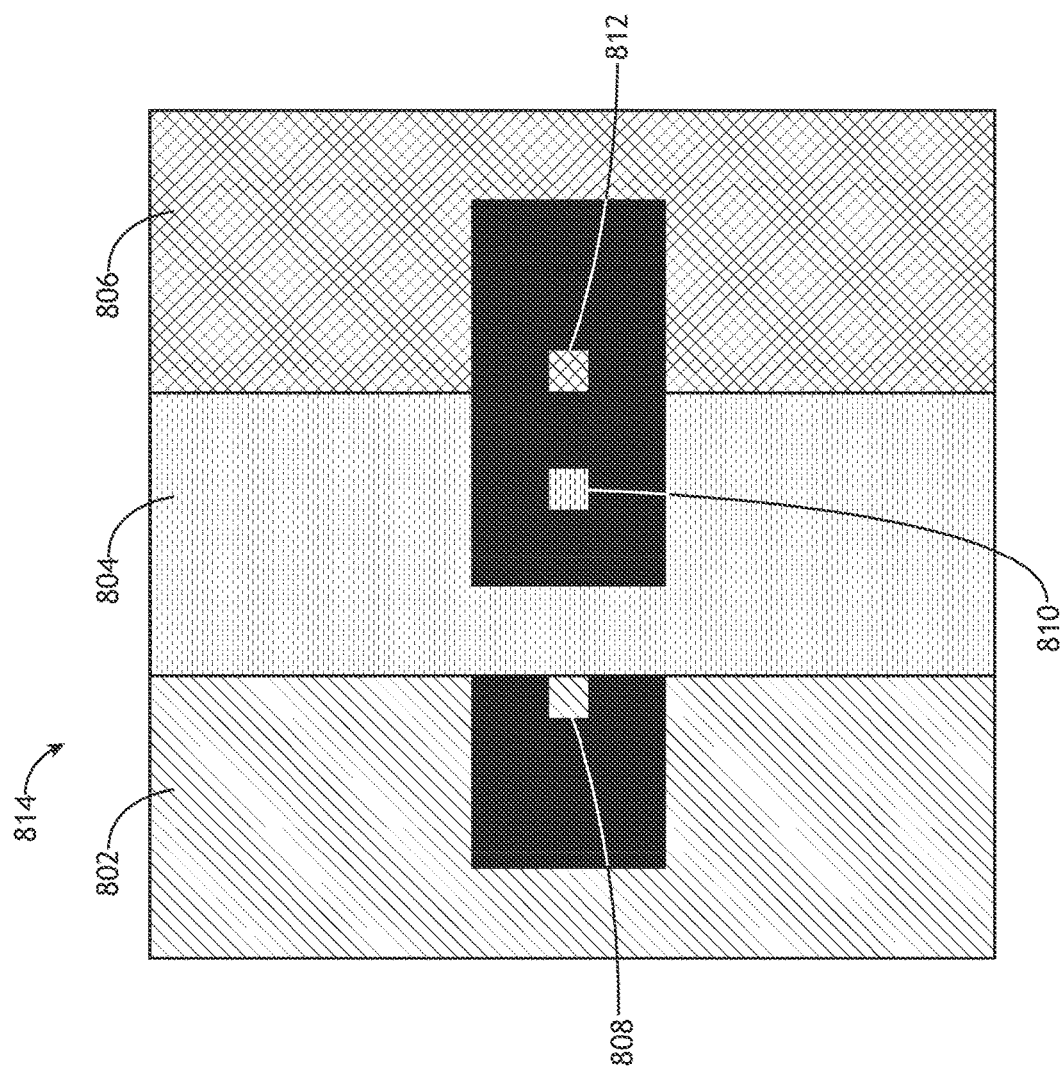

As shown in FIG. 8D, the display element 116 may have a six sub-pixel architecture. The pixel group 814 of FIG. 8D may be implemented and function similarly to the pixel group 814 of FIG. 8C, except that, for the pixel group 814 of FIG. 8D, each of the first, second, and third sub-pixels 802, 804, 806 may omit the connectors 816 and may extend around the centrally located fourth, fifth, and sixth sub-pixels 808, 810, 812. For example, the LED area for each of the first, second, and third sub-pixels 802, 804, 806 may be 8% larger than the area of the first, second, and third sub-pixels 802, 804, 806 of FIG. 8C, which may promote higher brightness when operating in day mode.

Referring now to FIG. 9, an exemplary embodiment of a method 900 according to the inventive concepts disclosed herein may include one or more of the following steps. Additionally, for example, some embodiments may include performing one more instances of the method 900 iteratively, concurrently, and/or sequentially. Additionally, for example, at least some of the steps of the method 900 may be performed in parallel and/or concurrently. Additionally, in some embodiments, at least some of the steps of the method 900 may be performed non-sequentially.

A step 902 may include providing a display element comprising a plurality of pixel groups, each of the plurality of pixel groups comprising a first set of sub-pixels and a second set of sub-pixels, the first set of sub-pixels comprising a first sub-pixel configured to output light of a first color, a second sub-pixel configured to output light of a second color, and a third sub-pixel configured to output light of a third color, the second set of sub-pixels comprising a fourth sub-pixel configured to output light of the first color, a fifth sub-pixel configured to output light of the second color, and a sixth sub-pixel configured to output light of the third color, wherein each of the fourth sub-pixel, the fifth sub-pixel, and the sixth sub-pixel has a maximum brightness that is dimmer than a maximum brightness of each of the first sub-pixel, the second sub-pixel, and the third sub-pixel.

A step 904 may include driving some or all sub-pixels of one of the first set of sub-pixels or the second set of sub-pixels while all sub-pixels of the other of the first set of sub-pixels or the second set of sub-pixels are undriven.

Further, the method 900 may include any of the operations disclosed throughout.

As will be appreciated from the above, embodiments of the inventive concepts disclosed herein may be directed to a method and a system including a first set of sub-pixels and a second set of sub-pixels.

As used throughout and as would be appreciated by those skilled in the art, "at least one non-transitory computer-readable medium" may refer to as at least one non-transitory computer-readable medium (e.g., e.g., at least one computer-readable medium implemented as hardware; e.g., at least one non-transitory processor-readable medium, at least one memory (e.g., at least one nonvolatile memory, at least one volatile memory, or a combination thereof; e.g., at least one random-access memory, at least one flash memory, at least one read-only memory (ROM) (e.g., at least one electrically erasable programmable read-only memory (EEPROM)), at least one on-processor memory (e.g., at least one on-processor cache, at least one on-processor buffer, at least one on-processor flash memory, at least one on-processor EEPROM, or a combination thereof), or a combination thereof), at least one storage device (e.g., at least one hard-disk drive, at least one tape drive, at least one solid-state drive, at least one flash drive, at least one readable and/or writable disk of at least one optical drive configured to read from and/or write to the at least one readable and/or writable disk, or a combination thereof), or a combination thereof).

As used throughout, "at least one" means one or a plurality of; for example, "at least one" may comprise one, two, three, . . . , one hundred, or more. Similarly, as used throughout, "one or more" means one or a plurality of; for example, "one or more" may comprise one, two, three, . . . , one hundred, or more. Further, as used throughout, "zero or more" means zero, one, or a plurality of; for example, "zero or more" may comprise zero, one, two, three, . . . , one hundred, or more.

In the present disclosure, the methods, operations, and/or functionality disclosed may be implemented as sets of instructions or software readable by a device. Further, it is understood that the specific order or hierarchy of steps in the methods, operations, and/or functionality disclosed are examples of exemplary approaches. Based upon design preferences, it is understood that the specific order or hierarchy of steps in the methods, operations, and/or functionality can be rearranged while remaining within the scope of the inventive concepts disclosed herein. The accompanying claims may present elements of the various steps in a sample order, and are not necessarily meant to be limited to the specific order or hierarchy presented.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:

1. A system, comprising:
   a display element, comprising:
     a plurality of pixel groups, each of the plurality of pixel groups comprising:
       a first set of sub-pixels, comprising:
         a first sub-pixel configured to output light of a first color;
         a second sub-pixel configured to output light of a second color; and
         a third sub-pixel configured to output light of a third color; and
       a second set of sub-pixels, comprising:
         a fourth sub-pixel configured to output light of the first color;
         a fifth sub-pixel configured to output light of the second color; and
         a sixth sub-pixel configured to output light of the third color;
       wherein each of the fourth sub-pixel, the fifth sub-pixel, and the sixth sub-pixel has a maximum brightness that is dimmer than a maximum brightness of each of the first sub-pixel, the second sub-pixel, and the third sub-pixel;
       wherein some or all sub-pixels of one of the first set of sub-pixels or the second set of sub-pixels are driven while all sub-pixels of the other of the first set of sub-pixels or the second set of sub-pixels are undriven;
       wherein the first sub-pixel is a red sub-pixel configured to output red light, wherein the second sub-pixel is a green sub-pixel configured to output green light, wherein the third sub-pixel is a blue sub-pixel configured to output blue light, wherein the fourth sub-pixel is another red sub-pixel configured to output red light, wherein the fifth sub-pixel is another green sub-pixel configured to output green light, wherein the sixth sub-pixel is another blue sub-pixel configured to output blue light;
   at least one processor communicatively coupled to the display element, the at least one processor configured to: operate in a day mode and a night mode;
   when in the day mode, receive red green blue (RGB) video, and drive some or all of the red, green, and blue sub-pixels of each of the first set of sub-pixels corresponding to the RGB video such that the RGB video is displayed with relatively high brightness; and when in the night mode, receive the RGB video, and drive some or all of the red, green, and blue sub-pixels of each of the second set of sub-pixels corresponding to the RGB video such that the RGB video is displayed with relatively low brightness; and control circuitry communicatively coupled to the display element, wherein the control circuitry includes: a first transistor communicatively coupled to the first sub-pixel, a second transistor communicatively coupled to the second sub-pixel, a third transistor communicatively coupled to the third sub-pixel, a fourth transistor communicatively coupled to the fourth sub-pixel, a fifth transistor communicatively coupled to the fifth sub-pixel, and a sixth transistor communicatively coupled to the sixth sub-pixel;

wherein when operating in the day mode, the first transistor, the second transistor, and the third transistor allow the first, second, and third sub-pixels, respectively, to be driven while the fourth transistor, the fifth transistor, and the sixth transistor prohibit the fourth, fifth, and sixth sub-pixels, respectively, from being driven; wherein when operating in the night mode, the first transistor, the second transistor, and the third transistor prohibit the first, second, and third sub-pixels, respectively, from being driven while the fourth transistor, the fifth transistor, and the sixth transistor allow the fourth, fifth, and sixth sub-pixels, respectively, to be driven.

2. The system of claim 1, wherein each of the fourth sub-pixel, the fifth sub-pixel, and the sixth sub-pixel has the maximum brightness that is at least four times dimmer than the maximum brightness of each of the first sub-pixel, the second sub-pixel, and the third sub-pixel, wherein each of the fourth sub-pixel, the fifth sub-pixel, and the sixth sub-pixel has a minimum brightness that is dimmer than a minimum brightness of each of the first sub-pixel, the second sub-pixel, and the third sub-pixel.

3. The system of claim 1, wherein the at least one processor is further configured to: determine whether to operate in the day mode or the night mode.

4. The system of claim 1, wherein each of the plurality of pixel groups is configured to provide color output by using 24 bits of bandwidth.

5. The system of claim 1, further comprising an optical system, the optical system comprising the display element.

6. The system of claim 5, further comprising a head-up display (HUD), the HUD comprising the optical system.

7. The system of claim 5, further comprising a head wearable device, the head wearable device comprising the optical system.

8. The system of claim 7, wherein the head wearable device is a near-eye display.

9. The system of claim 7, wherein the head wearable device is a helmet-mounted display (HMD).

10. The system of claim 9, wherein the HMD further comprises an eye tracking system, a head tracking system, at least one night vision sensor, at least one processor, and a visor.

11. A method, comprising:
providing a display element comprising a plurality of pixel groups, each of the plurality of pixel groups comprising a first set of sub-pixels and a second set of sub-pixels, the first set of sub-pixels comprising a first sub-pixel configured to output light of a first color, a second sub-pixel configured to output light of a second color, and a third sub-pixel configured to output light of a third color, the second set of sub-pixels comprising a fourth sub-pixel configured to output light of the first color, a fifth sub-pixel configured to output light of the second color, and a sixth sub-pixel configured to output light of the third color, wherein each of the fourth sub-pixel, the fifth sub-pixel, and the sixth sub-pixel has a maximum brightness that is dimmer than a maximum brightness of each of the first sub-pixel, the second sub-pixel, and the third sub-pixel, wherein the first sub-pixel is a red sub-pixel configured to output red light, wherein the second sub-pixel is a green sub-pixel configured to output green light, wherein the third sub-pixel is a blue sub-pixel configured to output blue light, wherein the fourth sub-pixel is another red sub-pixel configured to output red light, wherein the fifth sub-pixel is another green sub-pixel configured to output green light, wherein the sixth sub-pixel is another blue sub-pixel configured to output blue light;

providing at least one processor communicatively coupled to the display element, the at least one processor configured to: operate in a day mode and a night mode; when in the day mode, receive red green blue (RGB) video, and drive some or all of the red, green, and blue sub-pixels of each of the first set of sub-pixels corresponding to the RGB video such that the RGB video is displayed with relatively high brightness; and when in the night mode, receive the RGB video, and drive some or all of the red, green, and blue sub-pixels of each of the second set of sub-pixels corresponding to the RGB video such that the RGB video is displayed with relatively low brightness;

providing control circuitry communicatively coupled to the display element, wherein the control circuitry includes: a first transistor communicatively coupled to the first sub-pixel, a second transistor communicatively coupled to the second sub-pixel, a third transistor communicatively coupled to the third sub-pixel, a fourth transistor communicatively coupled to the fourth sub-pixel, a fifth transistor communicatively coupled to the fifth sub-pixel, and a sixth transistor communicatively coupled to the sixth sub-pixel, wherein when operating in the day mode, the first transistor, the second transistor, and the third transistor allow the first, second, and third sub-pixels, respectively, to be driven while the fourth transistor, the fifth transistor, and the sixth transistor prohibit the fourth, fifth, and sixth sub-pixels, respectively, from being driven; wherein when operating in the night mode, the first transistor, the second transistor, and the third transistor prohibit the first, second, and third sub-pixels, respectively, from being driven while the fourth transistor, the fifth transistor, and the sixth transistor allow the fourth, fifth, and sixth sub-pixels, respectively, to be driven; and driving some or all sub-pixels of one of the first set of sub-pixels or the second set of sub-pixels while all sub-pixels of the other of the first set of sub-pixels or the second set of sub-pixels are undriven.

* * * * *